(12) United States Patent
Tsappi (10) Patent No.: US 6,199,818 B1
(45) Date of Patent: *Mar. 13, 2001

(54) SUPPORT DEVICE FOR A POLE

(76) Inventor: Philip Tsappi, 24 Alder Grove, Cricklewood, London NW2 7DB (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,953

(22) Filed: Apr. 28, 1998

(30) Foreign Application Priority Data

| May 19, 1997 | (GB) | 9710029 |
| Sep. 17, 1997 | (GB) | 9719684 |
| Feb. 23, 1998 | (GB) | 9803614 |

(51) Int. Cl.⁷ .................................................. F16M 13/00
(52) U.S. Cl. ......................... 248/519; 47/40.5; 248/516; 248/524
(58) Field of Search .................... 248/519, 511, 248/530, 532, 523, 524, 156, 910, 346.01, 346.11, 521, 346.2, 346.04, 349.1; 47/40.5; 135/16; 52/166, 165

(56) References Cited

U.S. PATENT DOCUMENTS

| 395,766 | * | 1/1889 | Westphal | 248/521 |
| 1,124,780 | * | 1/1915 | Miller et al. | 47/40.5 |
| 1,598,016 | * | 8/1926 | Runser | 248/539 |
| 1,805,095 | * | 5/1931 | Horni | 248/523 |
| 2,674,147 | * | 4/1954 | Franklin | 248/522 |
| 2,893,668 | * | 7/1959 | Applegate | 248/516 |
| 3,038,688 | * | 6/1962 | Thorburn | 47/40.5 |
| 3,142,464 | * | 7/1964 | Zelenitz | 47/40.5 |
| 3,298,642 | * | 1/1967 | Taylor | 248/346.04 |
| 3,350,043 | * | 10/1967 | Apple | 248/523 |
| 3,729,157 | * | 4/1973 | Haff | 47/40.5 |
| 3,733,040 | * | 5/1973 | Rocquin | 248/524 |
| 4,148,455 | * | 4/1979 | Oliver | 248/524 |
| 4,544,351 | * | 10/1985 | Marsicano | 431/288 |
| 4,585,201 | * | 4/1986 | Pursell | 248/523 |
| 4,750,702 | * | 6/1988 | Neil et al. | 248/523 |
| 4,976,411 | * | 12/1990 | Gordon et al. | 248/524 |
| 5,271,196 | * | 12/1993 | Fanti | 248/156 |
| 5,484,131 | * | 1/1996 | Aldrete et al. | 248/527 |
| 5,492,301 | * | 2/1996 | Hauser | 248/516 |
| 5,639,056 | * | 6/1997 | Mecalf | 248/523 |

* cited by examiner

Primary Examiner—Anita M. King
(74) Attorney, Agent, or Firm—Lumen Intellectual Property Services (57) ABSTRACT

A support device for supporting a substantially vertical pole within an open-topped receptacle comprising a substantially vertical open-topped tube secured to a first flat plate. The first flat plate is locatable within the receptacle, and a second flat plate is locatable outside the receptacle. The two plates are secured to one another by suitable securing means such that part of the receptacle is trapped therebetween.

23 Claims, 8 Drawing Sheets

SUPPORT DEVICE FOR A POLE

TECHNICAL FIELD

This invention relates to a support device for supporting a substantially vertical pole. More particularly, the present invention relates to a support device for use in combination with a plant receptacle to support and provide stability to a garden umbrella, parasol, rotary clothes line, or bamboo cane or the like as typically used to support young plants or saplings or the like. Thus, in the Specification, the word "pole" is used with a very broad meaning.

BACKGROUND ART

Garden umbrellas or the like are usually supported by inserting the umbrella pole through a central aperture formed in a garden table. The lower end of this pole is then inserted into a container, via an aperture therein. The container is situated below the table and is usually filled with water or sand for added stability. However, in the absence of the table, this method of support is inadequate for supporting the considerable weight of a garden umbrella or the like.

Commonly used methods for supporting a rotary clothes line comprise inserting a length of tube or a spike into the ground. In the case of concrete patios, this involves a permanent installation which cannot be moved. In the case of inserting a tube or spike into a lawn, it is especially advantageous to be able to vary the position of the clothes line so that particular areas of the lawn do not get worn due to constant treading. Also, in wet weather, the ground becomes wet and muddy, resulting in the possibility of the installation working loose, which is clearly disadvantageous.

It is known to provide support to the stems of plants such as tomatoes, cucumbers, runner beans, etc., and to support saplings throughout their early stages of growth. Typically, such plants or saplings are grown in easily transportable pots or receptacles, prior to being transplanted into the ground. Fruit bearing plants such as tomatoes generally require more support than, for example, young saplings which are inherently more rigid and carry less weight.

A commonly used method of supporting plant stems within plant receptacles, is to use lengths of bamboo cane, or the like, inserted vertically into the earth within the receptacle next to the plant. The stem of the plant may then be loosely tied to the cane in stages as the plant grows. However, a common problem when using bamboo canes, is that they provide only limited support in windy conditions, the canes themselves being easily damaged. It is particularly difficult to provide the plants with adequate support when using a cane inserted into the soil within a small receptacle, since the length of cane inserted within the limited depth of the soil within the receptacle is typically relatively short when compared with the overall vertical length of the cane. In the event that the support, in this case bamboo canes, collapses, then substantial damage occurs to the plant.

A plant support device has been disclosed in published Patent Specification GB2307170A which encloses the stem of a plant. However, although the arrangement disclosed in GB2307170A is clearly effective in supporting the stem of a plant as long as the support device itself is sufficiently stable, it is often difficult to ensure that the support device is in fact stable, thereby reducing its effectiveness. Furthermore, it is often the case that a simple cane, inserted into the soil within a plant receptacle, is more advantageous, under certain circumstances, than more complicated plant support devices, for instance if space is limited. Therefore, it is clearly advantageous to provide a plant support device, such as for example, that disclosed in GB2307170A or, alternatively, a simple cane or the like, with additional stability.

The present invention therefore seeks to provide an improved support device.

DISCLOSURE OF INVENTION

According to the present invention, there is provided a support device for supporting a substantially vertical pole within an open-topped receptacle, the device comprising a substantially vertical open-topped tube secured to a first substantially flat plate, a second substantially flat plate, and securing means adapted to secure said two plates to one another with part of the receptacle trapped therebetween.

Preferably, the first substantially flat plate is locatable within the receptacle and the second substantially flat plate is locatable outside the receptacle.

Alternatively, the first substantially flat plate is locatable outside the receptacle such that the open-topped tube passes through an aperture in the receptacle and the second substantially flat plate is locatable within the receptacle, the second substantially flat plate being provided with an aperture to receive the open-topped tube therethrough.

Preferably, said receptacle has a substantially flat bottom portion, and said plates are locatable on respective sides of the bottom portion, to trap the bottom portion therebetween.

Advantageously, said securing means comprises a plurality of fasteners passing through each of said plates and through apertures formed in the receptacle.

Advantageously, the support device further comprises spacing means adapted to space the second plate from the receptacle.

Conveniently, the support device further comprises stabilizing means extending substantially horizontally from the receptacle.

Advantageously, part of said stabilising means is receivable within the gap thus formed between the receptacle and the second plate.

Preferably, said stabilizing means comprises a plurality of arms.

Advantageously, said tube is provided with a drainage aperture at its lower end.

Conveniently, said tube is provided with at least one resiliently deformable element secured thereto, the or each resiliently deformable element having at least one surface engageable with the pole when the pole is received within the tube, and being adapted to accommodate poles of various dimensions.

Preferably, the or each resiliently deformable element is secured to the tube at the upper end of the tube.

Advantageously, the open-topped tube is also open at its lowermost end, the securing means comprising a cylindrical element secured to the second substantially flat plate, the cylindrical element being insertable through an aperture in the receptacle, such that the cylindrical element may be received within the open lowermost end of the open-topped tube.

Conveniently, the cylindrical element is an interference fit within the lowermost end of the open-topped tube.

Preferably, the cylindrical element and lowermost end of the open-topped tube are threadedly engageable.

Advantageously, said cylindrical element is provided with an axial bore, said axial bore being open at the uppermost end of the cylindrical element.

Conveniently, the support device further comprises a sleeve, said sleeve being sized to fit over the open-topped tube, such that at least part of the sleeve extends above the uppermost end of the open-topped tube.

Preferably, said tube has a stepped bore, thereby providing a plurality of bore portions, each bore portion having a different diameter.

Advantageously, the support device further comprises a plurality of said open-topped tubes.

Conveniently, said plurality of tubes are each secured to a single first substantially flat plate.

Preferably, the support device comprises a plurality of said cylindrical elements.

Advantageously, said plurality of cylindrical elements are each secured to a single said second substantially flat plate.

BRIEF DESCRIPTION OF DRAWINGS

In order that the invention may be more readily understood, and so that further features thereof may be appreciated, embodiments of the invention will now be described by way of example, with reference to the accompanying drawings, in which.

MODES OF CARRYING OUT THE INVENTION

Figure 1:
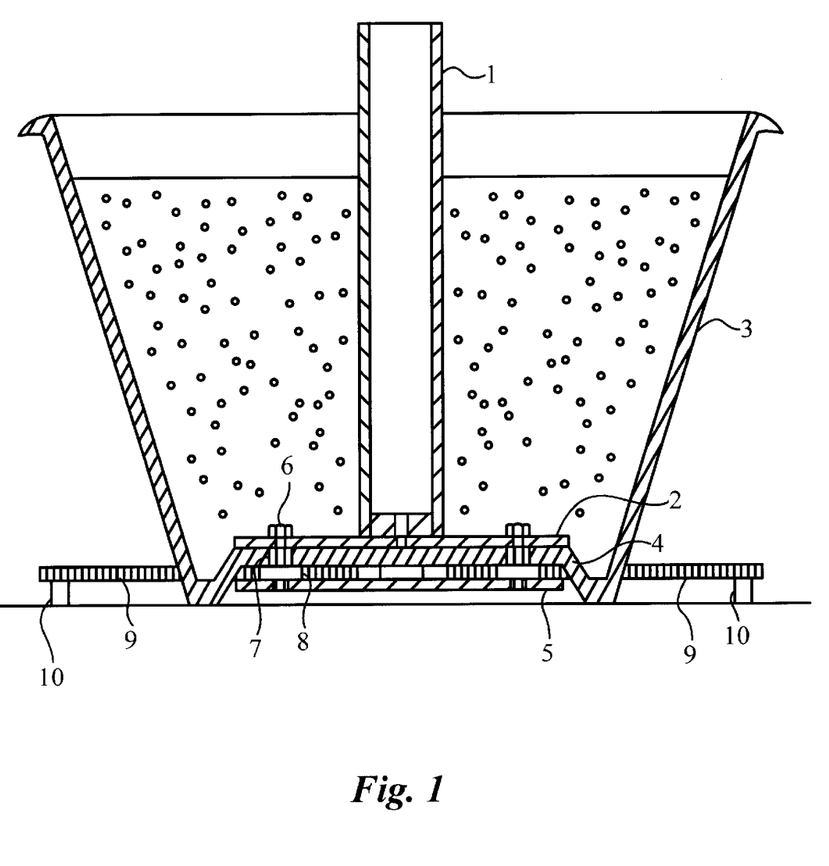
FIG. 1 is a sectional view of the support device of the present invention, in combination with a plant receptacle.
Figure 2:
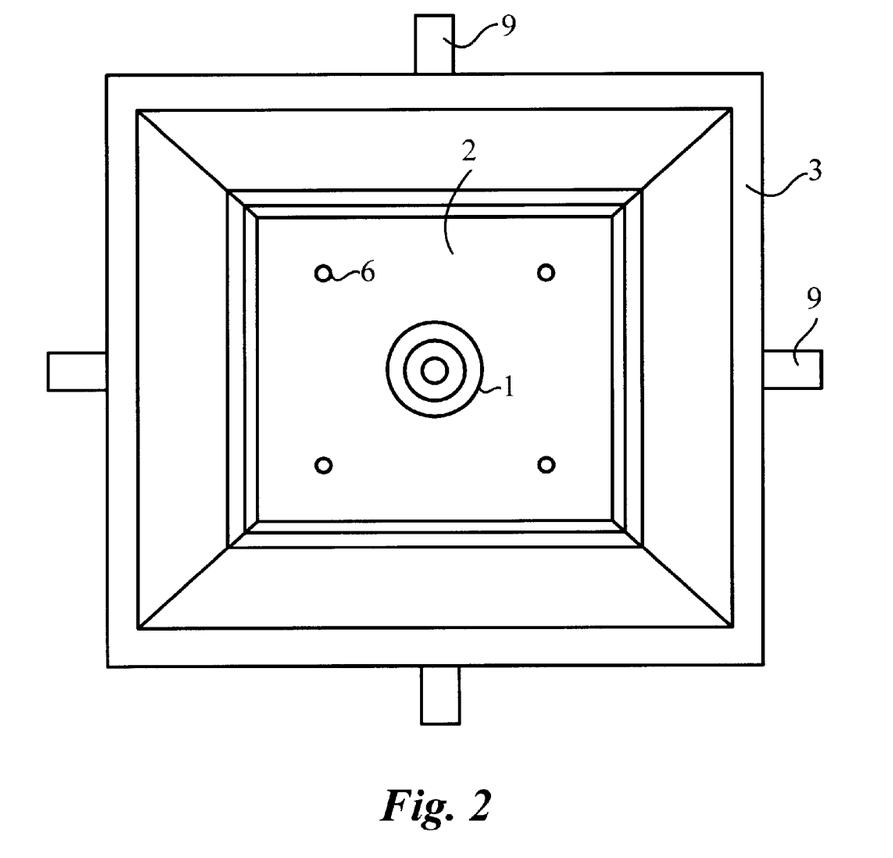
FIG. 2 is a plan view of the support device of FIG. 1.

Referring initially to FIG. 1, a support device is shown comprising a substantially vertical, open-topped tube 1 secured at its lower end to a first substantially horizontal flat plate 2.

The first flat plate 2 is located within an open-topped receptacle 3, and rests upon the inner surface of a substantially flat bottom portion 4 of the receptacle 3.

Outside the receptacle 3, beneath the bottom portion 4 of the receptacle, there is located a second substantially horizontal flat plate 5, which may be secured to the first flat plate 2, via any conventional securing means, such that the bottom portion 4 of the receptacle is located between the two flat plates 2, 5. In the preferred embodiment of the present invention, said securing means takes the form of a plurality of fasteners or studs 6 which pass through each of the two plates 2, 5 and through corresponding apertures 7 formed in the bottom portion of the receptacle 3. Such apertures 7 may, for example, be conventional drainage apertures formed in a plant pot.

As may also be seen from FIG. 1, the second flat plate 5 is spaced slightly from the bottom portion 4 by a number of spaces 8 located around respective fasteners or studs 6.

In the event that the support device of the present invention is to support a large garden umbrella, clothes line or the like in windy conditions, there is provided additional stabilising means in the form of a plurality of substantially horizontal arms 9. Each arm 9 is adapted at one end to fit between the gap formed between the second plate 5 and the bottom portion 4 of the receptacle as a result of the spacers 7, for example as a simple friction fit. At their outer ends, each stabilising arm 9 is provided with a small foot 10, for example in the form of a rubber buffer.

When the receptacle is filled with earth, the assembly is generally sufficiently heavy to support an umbrella or clothes line under normal wind conditions. However, as mentioned above, on windier days, the stabilizing arms 9 may easily be inserted, and it is not envisaged that any further securing means need be provided.

It is possible for the arrangement respectively be modified in a number of ways. For example, for use with receptacles having a considerable surface area in contact with the ground rather than receptacles having a lower peripheral rim such as that illustrated in FIG. 1, the tube 1 may be secured to the flat plate which is locatable outside the receptacle. This arrangement would involve the provision of an aperture in the receptacle for the tube 1 to pass through. The flat plate locatable within the receptacle could then be provided with a similar aperture so that it could be placed over the tube 1 to add strength to the arrangement—particularly if the receptacle is made from flexible plastics material. To increase the stability of this arrangement, the flat plate located outside the receptacle is sized so as to cover a larger area of the ground than the receptacle.

Figure 3:
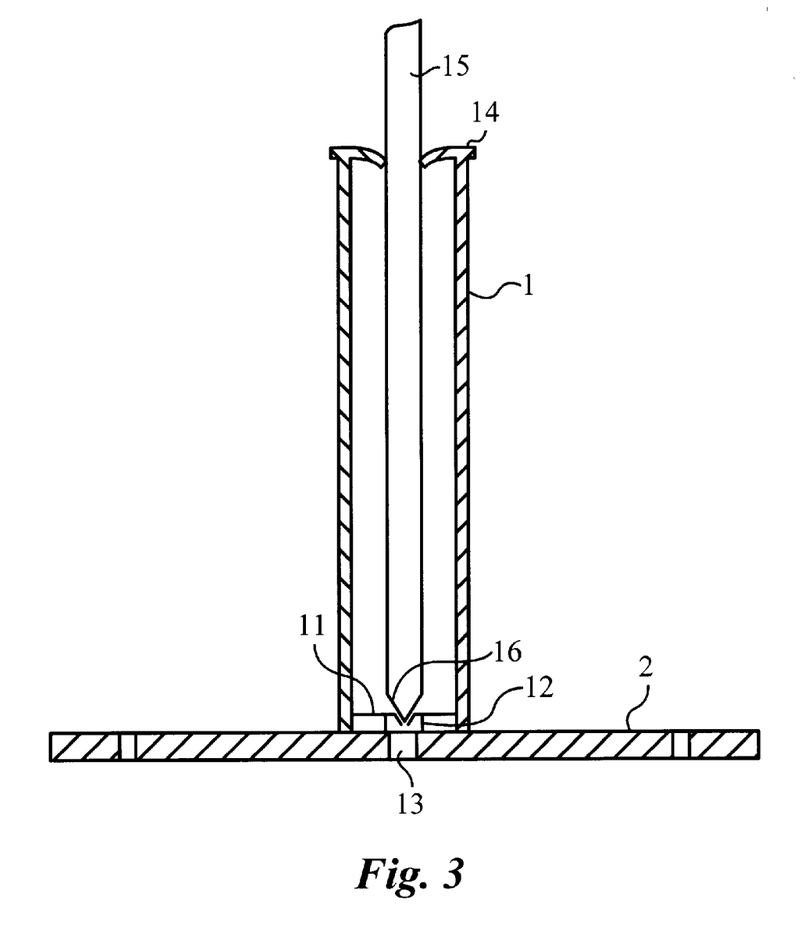
FIG. 3 is a sectional view of part of the support device of FIG. 1.

Referring now to FIG. 3 of the accompanying drawings, it will be seen that the lower end of the tube 1 is provided with a collar 11 having a central aperture 12 formed therein. Central aperture 12 communicates with a corresponding aperture 13 formed in the first flat plate 2. These apertures 12, 13, operate as drainage apertures, to allow water to drain from the tube 1. Also, under dry weather conditions, the tube may be filled with water to provide slow irrigation to the plants within the receptacle.

In order to accommodate securely poles of varying dimensions, the upper end of the tube 1 is provided with a resiliently deformable element 14 secured thereto. The resiliently deformable element 14 is engageable with a pole 15 to provide lateral support to the pole 15 whilst accommodating securely poles of various diameters. The resiliently deformable element 14 may take the form of a rubber sealing strip with wire inserts, or a plurality of resilient fingers which grip the pole 15. Alternatively, to accommodate a pole of a predetermined diameter smaller than that of the tube 1, a bush could be inserted into the tube 1 to reduce its effective internal diameter by a suitable amount.

To ensure that the pole 15 is supported substantially vertically, the lower end of the pole may be formed as a point 16 which may then be received within the central aperture 12 in the collar 11.

Figure 4:
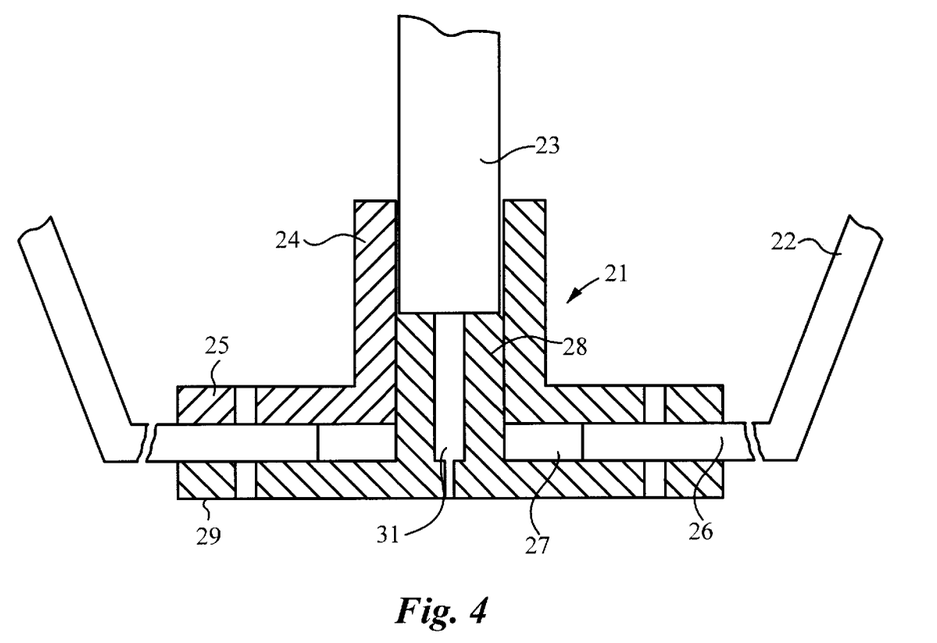
FIG. 4 is a sectional view of an alternative embodiment of the support device, in combination with a plant receptacle and a pole.
Figure 5:
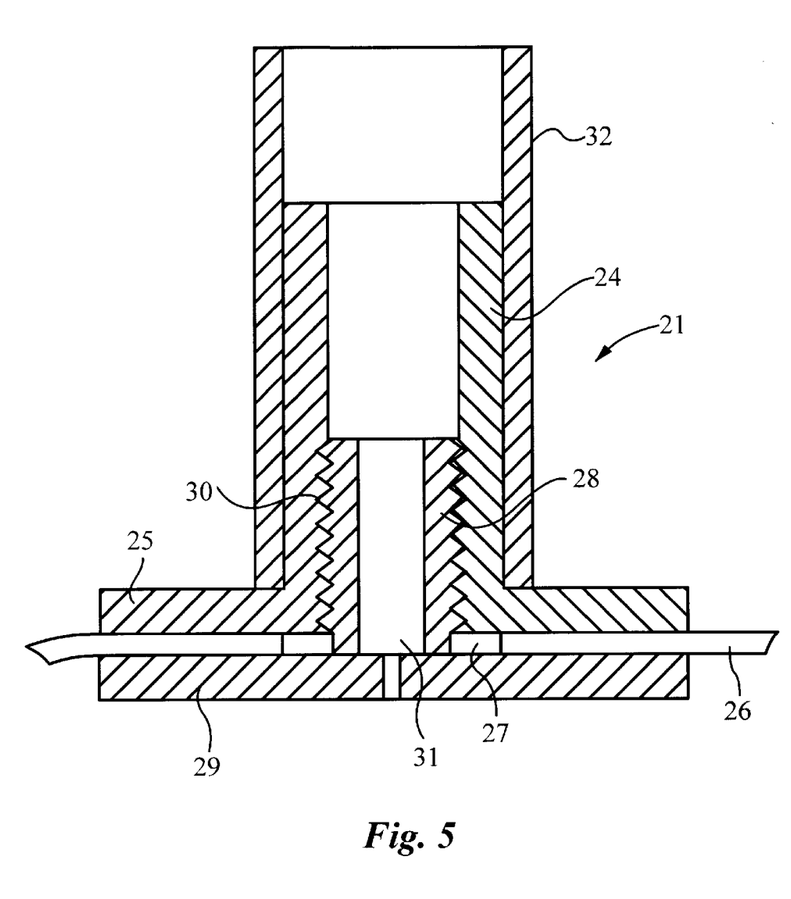
FIG. 5 is a sectional view illustrating a variant of the support device illustrated in FIG. 4, in combination with a plant receptacle.
Figure 6:
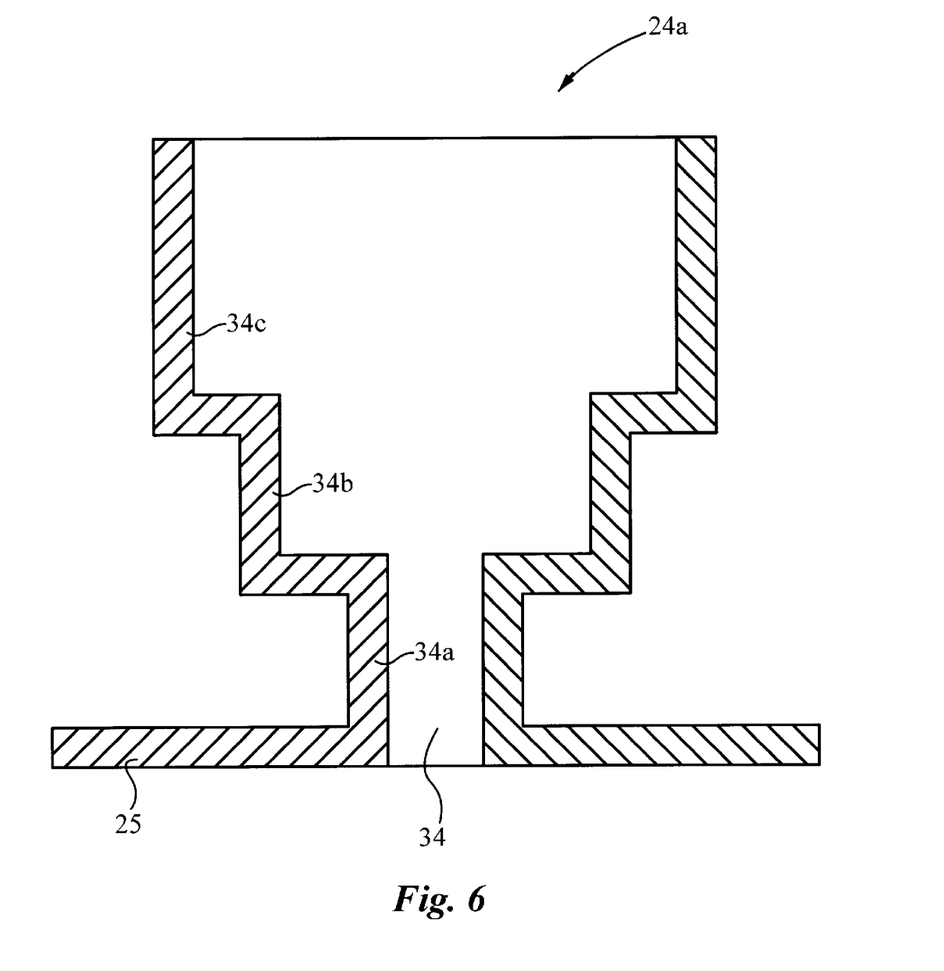
FIG. 6 is a sectional view illustrating an alternative component part of the support device illustrated in FIGS. 4 and 5.
Figure 7:
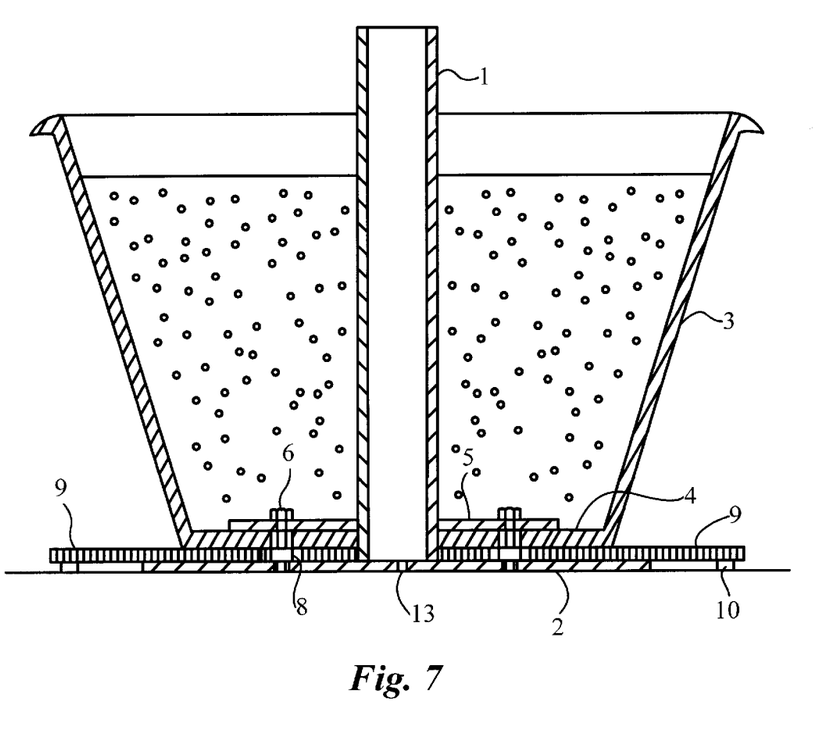
FIG. 7 is a sectional view of an alternative embodiment of the present invention.

Turning now to FIGS. 4 to 6, alternative embodiments of the present invention are illustrated.

FIG. 4 shows a support device 21 in combination with an open-topped receptacle 22 and a substantially vertical pole 23. The support device 21 comprises an open-topped vertical tube 24 secured at its lower end to a first substantially horizontal flat plate 25. The open-topped tube 24 is secured to the first plate 25 over an aperture in the first plate 25, the aperture having substantially the same diameter as the bore of open-topped tube 24, so that the tube 24 also has an open lowermost end. Thus, the arrangement takes the form of a tube having an open top and an open bottom and having a substantially flat, radially outwardly extending flange formed at its lowermost end. The first plate 25 is locatable within the open-topped receptacle 22, and as illustrated in FIG. 4, most preferably rests upon a substantially flat bottom portion 26 of the receptacle 22.

The aperture in the plate 25 is located over an aperture 27 formed in the base of the receptacle 22, such that the upper end of a substantially vertical cylindrical element 28 may be inserted through the aperture 27, from beneath receptacle 22, such that the cylindrical element 28 is received within open lowermost end of the open-topped tube 24. As illustrated in FIG. 4, the aperture 27 may take the form of, for example, a conventional drainage aperture formed in the substantially flat bottom portion 26 of the receptacle 22.

The cylindrical element 28 is secured at its lowermost end to a second substantially horizontal flat plate 29. As the cylindrical element 28 is inserted through the aperture 27 formed in the receptacle 22, and is received within the bore of the open-topped tube 24, the second plate 29 is located outside the receptacle 22, and eventually abuts the outermost surface of the receptacle 22, such that a region of the receptacle 22 is located or trapped between the first plate 25 and the second plate 29.

In the arrangement illustrated in FIG. 4, the cylindrical element 28 is sized so as to be an interference fit within the open-topped tube 24, thereby retaining the open-topped tube 24 in position with the receptacle 22, and serving as securing means adapted to secure the first plate 25 and second plate 29 to one another, with part of the receptacle trapped therebetween. However, as illustrated in FIG. 5, in an alternative arrangement, the outermost surface of the cylindrical element 28 under the innermost surface of the lowermost end of the open-topped tube 24, are each threaded, at 30, such that the cylindrical element 28 may be threadedly engaged within the open-topped tube 24.

Since a region of the receptacle 22, most preferably the bottom portion 26, is effectively trapped between the first flat plate 25, and the second flat plate 29, the open-topped tube 24 is prevented from moving substantially angularly with respect to the receptacle 22.

When the arrangement illustrated in FIG. 4 is to be used to support a large or considerably heavy pole, added strength can be provided by supplementing the securing means with a number of self tapping screws or bolts passing through apertures formed in the first and second flat plates 25, 29 and the bottom portion 26 of the receptacle.

As illustrated in FIG. 4, the open-topped tube 24, at least at its uppermost end, may receive the lower part of a substantially vertical pole, for example a bamboo cane, statue, or the like, thereby providing support and stability to the pole.

As illustrated in both FIGS. 4 and 5, the cylindrical element 28 is provided with an axial bore 31, open at its uppermost end, and a small diameter hole at its lower end. The axial bore 31 within the cylindrical element 28 has a smaller diameter than the bore of open-topped tube 24, and therefore may accommodate a smaller diameter pole 23, than can the open-topped tube 24. In this way, the support device 21, is adapted to accommodate various sized poles 23.

Furthermore, as illustrated in FIG. 5, a sleeve 32 may be provided, the sleeve 32 being sized to fit tightly over the open-topped tube 24, such that the lowermost end of sleeve 32 rests upon the uppermost surface of the first flat plate 25.

As illustrated, the internal diameter of the sleeve 32, is greater than the diameter of the bore of the open-topped tube 24, and so in this way, the sleeve 32 may accommodate a larger pole 23, than can the open-topped tube 24.

Turning now to FIG. 6, an alternative configuration 24a of the open-topped tube 24 is illustrated, which may be substituted for the open-topped tube 24 hereinbefore described. The lowermost end of the alternative tube 24a is again secured to a first substantially flat plate 25. However, the alternative tube 24a, illustrated in FIG. 6, has a stepped bore 34 having a plurality of differently-sized portions 34a, 34b, 34c. As will be appreciated, this alternative tube 24a may accommodate a range of differently sized poles 23, in respective bore portions.

Figure 8:
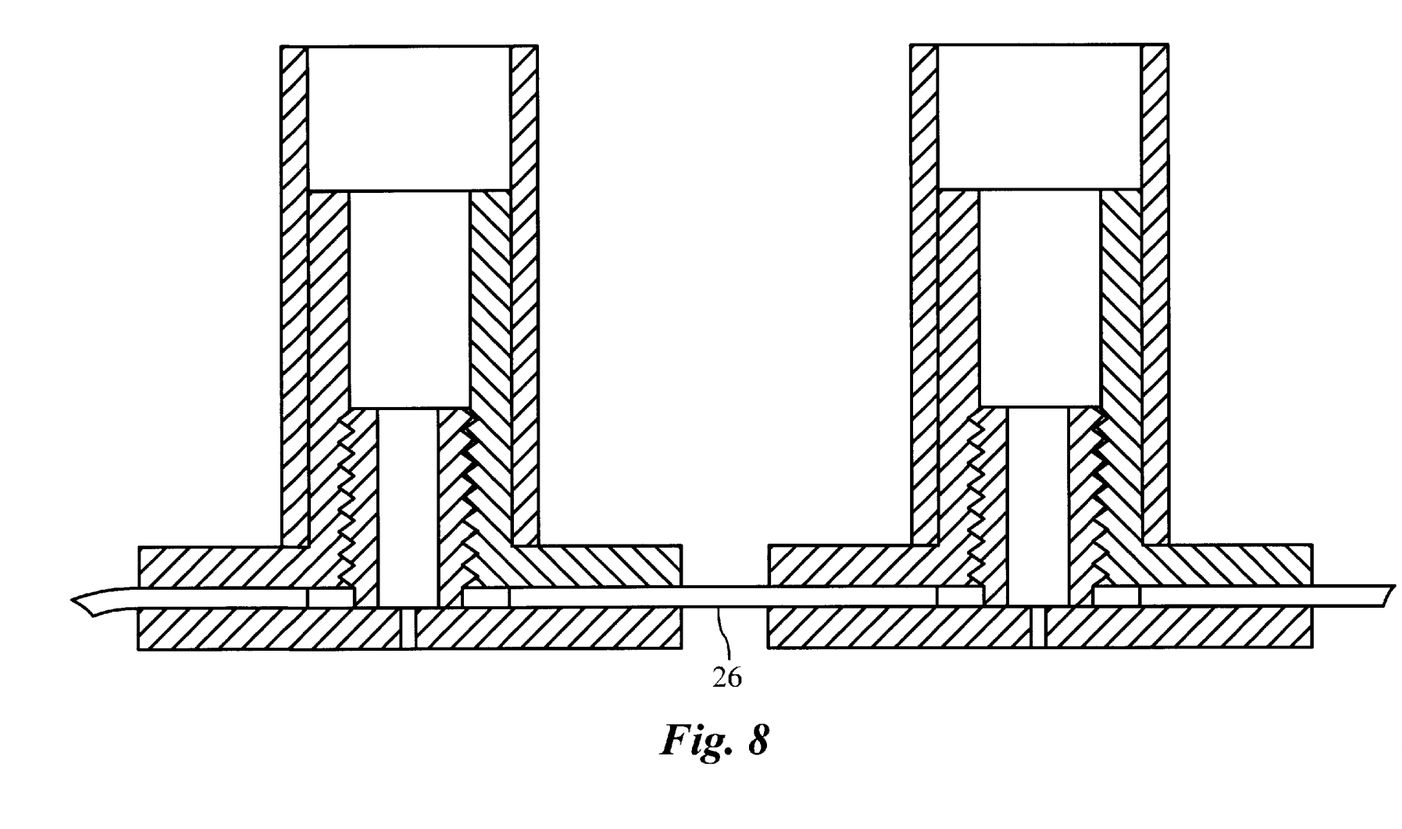
FIG. 8 is a sectional view of an alternative embodiment of the support device of the present invention.

It is to be appreciated that whilst the present invention has been described with reference to specific embodiments, various modifications could be effected without departing from the scope of the invention. For example, as shown in FIG. 8, it is envisaged that a variant of the support device may comprise a plurality of open-topped tubes, the lowermost end of each open-topped tube being secured to a single, common first substantially flat plate. In the event that the embodiments illustrated in FIGS. 4 to 6 comprises such a plurality of open-topped tubes secured to a single, common first plate 25, in combination with a receptacle 22 having a plurality of apertures 27 formed therein, it is also proposed to use a plurality of cylindrical elements 28 as previously described, each of said cylindrical elements 28 being received within a respective open-topped tube 24. Furthermore, it is also envisaged that each of said plurality of cylindrical elements 28 may be secured at their lowermost end to a single, common second substantially flat plate 29.

I claim:

1. A support device for supporting a substantially vertical pole in an open-topped receptacle, said support device comprising:
   (a) a first substantially flat plate locatable within said receptacle;
   (b) a second substantially flat plate locatable outside said receptacle and secured to said first substantially flat plate;
   (c) a substantially vertically open-topped tube secured to said first substantially flat plate for inserting said substantially vertical pole;
   (d) securing means for securing said first substantially flat plate to said second substantially flat plate;
   (e) a plurality of spacers for creating a gap between said second substantially flat plate and said receptacle; and
   (f) a plurality of stabilizing arms inserted into said gap to provide additional support for said substantially vertical pole.

2. The support device according to claim 1, wherein said first substantially flat plate is provided with a drainage aperture.

3. The support device according to claim 1, wherein said open-topped tube is releasably secured to said first substantially flat plate.

4. The support device according to claim 1, wherein said securing means comprise a plurality of fasteners passing through said spacers, through apertures in said first substantially flat plate, and through apertures in said second substantially flat plate, wherein said fasteners attach said first and second flat plates to said receptacle.

5. The support device according to claim 1, wherein said stabilizing arms extend substantially horizontally.

6. The support device according to claim 1, wherein said open-topped tube is provided with at least one resiliently deformable element.

7. The support device according to claim 6, wherein said resiliently deformable element has at least one surface engageable with said pole when said pole is received within said open-topped tube.

8. The support device according to claim 6, wherein said resiliently deformable element is secured to said open-topped tube at an upper end of said tube.

9. The support device according to claim 1, further comprising an open-topped receptacle having a bottom positioned between said first substantially flat plate and said spacers.

10. The support device for supporting a substantially vertical pole in an open-topped receptacle, said support device comprising:
(a) a first substantially flat plate locatable outside said receptacle;
(b) a substantially vertical open-topped tube secured to said first substantially flat plate such that said open-topped tube passes through an aperture in the bottom of said receptacle;
(c) a second substantially flat plate locatable within said receptacle and provided with an aperture to receive said open-topped tube therethrough;
(d) securing means for securing said first substantially flat plate to said second substantially flat plate;
(e) a plurality of spacers for creating a gap between said first substantially flat plate and said receptacle; and
(f) a plurality of stabilizing arms inserted into said gap to provide additional support for said substantially vertical pole.

11. The support device according to claim 10, wherein said first substantially flat plate is provided with a drainage aperture.

12. The support device according to claim 10, wherein said securing means comprise a plurality of fasteners passing through said spacers, through apertures in said first substantially flat plate, and through apertures in said second substantially flat plate, wherein said fasteners attach said first and second flat plates to said receptacle.

13. The support device according to claim 10, wherein said open-topped tube is releasably secured to said first substantially flat plate.

14. The support device according to claim 10, wherein said open-topped tube is provided with at least one resiliently deformable element.

15. The support device according to claim 14, wherein said resiliently deformable element has at least one surface engageable with said pole when said pole is received within said open-topped tube.

16. The support device according to claim 14, wherein said resiliently deformable element is secured to said open-topped tube at an upper end of said tube.

17. The support device according to claim 10, further comprising an open-topped receptacle having a bottom with an aperture, said receptacle positioned between said spacers and said second substantially flat plate such that said open-topped tube passes through said aperture in said receptacle.

18. A support device for supporting a substantially vertical pole in an open-topped receptacle, said support device comprising:
(a) a first substantially flat plate locatable within said receptacle and provided with an aperture;
(b) a substantially vertical open-topped tube secured to said first substantially flat plate and located around said aperture in said first substantially flat plate;
(c) a second substantially flat plate locatable outside said receptacle;
(d) a cylindrical element secured to said second substantially flat plate and passing through an aperture in said receptacle and through said aperture in said first substantially flat plate, said cylindrical element being threadably engaged with a lower end of said open-topped tube, for securing said first and second substantially flat plates, thereby trapping said receptacle; and
(e) an open-topped sleeve releasably secured to said open-topped tube, for inserting said pole.

19. The support device according to claim 18, wherein said cylindrical element is provided with an axial bore being open at an upper end of said cylindrical element.

20. The support device according to claim 18, wherein said open-topped sleeve has a stepped bore having a plurality of bore portions, each bore portion having a different diameter.

21. The support device according to claim 18, further comprising a plurality of open-topped tubes secured to said first substantially flat plate.

22. The support device according to claim 21, further comprising a plurality of open-topped sleeves releasably secured to an equal number of said plurality of open-topped tubes.

23. The support device according to claim 18, further comprising a plurality of cylindrical elements secured to said second substantially flat plate and passing through apertures in said receptacle and through apertures in said first substantially flat plate.

* * * * *